INVENTOR
MILTON BERNARD HOLLANDER
BY

ATTORNEY

3,234,642
FRICTION WELDING

Milton Bernard Hollander, Stamford, Conn., assignor to American Machine & Foundry Company, a corporation of New Jersey
Filed May 24, 1962, Ser. No. 197,346
3 Claims. (Cl. 29—470.3)

This invention relates in general to friction welding and, more particularly, to the friction welding of workpieces after at least one workpiece has been preheated.

When two metals having different properties are friction welded, one workpiece may soften and start to flow before the other. This late softening of one workpiece may make it difficult or even impossible to weld certain combinations of metals or it may cause excessive and undesirable upset of one friction welded workpiece.

It is, therefore, an object of this invention to control the amount of upset produced when workpieces of dissimilar metals are friction welded.

Another object of this invention is to preheat a higher melting workpiece prior to friction welding without the use of an external heat source.

A further object of this invention is to provide a less costly method to preheat a workpiece prior to friction welding.

A still further object of this invention is to provide a method whereby a workpiece to be friction welded may be more rapidly preheated with the preheating confined more closely to the weld area.

Yet another object of this invention is to provide a superior friction welding technique for dissimilar metals.

Many other objects, advantages, and features may be found in this invention and its practice as will be described in the following specification and accompanying drawing wherein.

Figure 1:
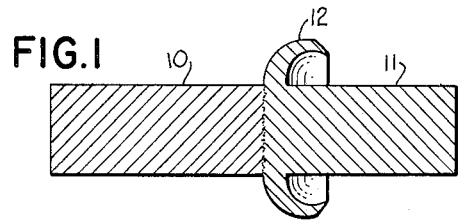
FIGURE 1 is a longitudinal vertical section through two workpieces of dissimilar metals which have been conventionally friction welded.

Referring to the drawing in detail, FIGURE 1 shows two workpieces 10 and 11 after they have been conventionally friction welded. To accomplish conventional friction welding of these workpieces, workpiece 10, which may be of copper, is rapidly rotated while workpiece 11, which may be of aluminum, is pressed against it. This relative rotation is rapidly stopped when sufficient heat is generated by friction in the contact or weld area to bond or weld the workpieces as they are pressed together.

As shown in FIGURE 1, the lower melting aluminum workpiece 11 melts before the copper workpiece 10 and throws off the relatively large upset 12. This large upset must be machined from the welded workpieces in most applications. In any case, the relatively large upset from the lower melting workpiece results in a waste of material. With some combinations of metals, conventional friction welding techniques will be unable to produce welds or will only produce welds which are too weak to be satisfactory.

Figure 2:
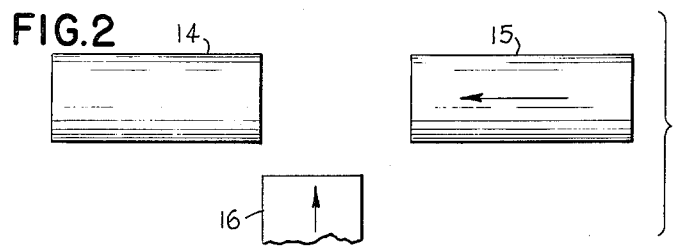
FIGURES 2, 3, 4 and 5 are top views of workpieces being positioned prior to being friction welded; one workpiece being friction preheated, being positioned for friction welding, and being friction welded; and, FIGURE 6 is a longitudinal section through two workpieces of dissimilar metals after they have been friction welded according to this invention.

As shown in FIGURE 2, two workpieces 14 and 15 are fixed in a conventional friction welding apparatus (not shown). Workpiece 14 is rotated in a suitable chuck or other holding device (not shown) and workpiece 15 is mounted to be held stationary and pressed against workpiece 14. Workpiece 14 may be of copper and workpiece 15 may be of aluminum.

Figure 3:
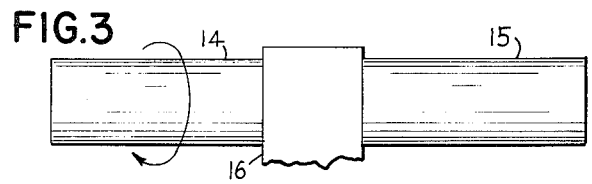
Figure 4:
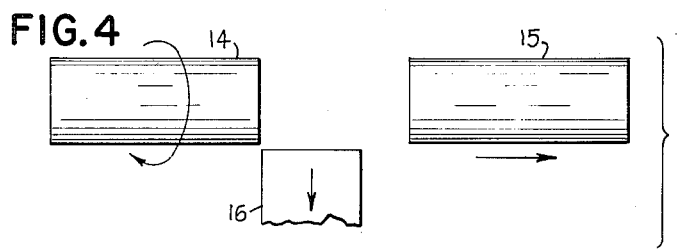

Referring now to FIGURE 3, a preheating block 16 of steel, or some other metal having a melting point higher than workpiece 14, is held between workpieces 14 and 15 to be pressed by workpiece 15 against the rotating workpiece 14. As soon as the workpiece 14 is preheated by its frictional contact with the preheating block 16, the workpiece 15 is moved away from the workpiece 14 and the preheating block 16 is removed from between the workpieces 14 and 15 as shown in FIGURE 4.

Figure 5:
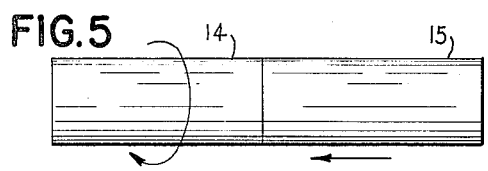
Figure 6:
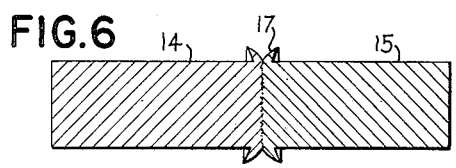

As shown in FIGURE 5, the preheated and rotating workpiece 14 has the workpiece 15 forced against it. When a weld temperature is reached in the area of contact, the relative rotation of the workpieces 14 and 15 is rapidly stopped and the workpieces are continued to be forced together to produce the weld shown in FIGURE 6. The smaller resulting upset 17 may thus be controlled to be substantially equal for both the higher and lower melting workpieces. In some cases the upset may be controlled or reduced to such an extent that good welds are produced and the upset need not be removed from the finished workpieces.

If, as in the given example, pure aluminum is welded to pure copper, the melting temperature of the aluminum is about 1220 degrees F. and the melting temperature of the copper is about 1980 degrees F. However, the actual melting temperature at the weld interface may be lower than that of the aluminum or copper as an eutectoid is formed having a lower melting temperature than either metal. The preheating of the copper controls the formation of the eutectoid and thus the upset formed while welding. Thus the preheating of the higher melting workpiece enables the formation of a superior weld despite the fact that there is, in this example, a difference of about 760 degrees F. in the melting points of the workpieces.

The frictional preheating of metal workpieces prior to friction welding provides particularly good welds between dissimilar metals because the preheating is concentrated where it is required in the weld area. The frictional preheating has a further advantage in that the moving contact between the higher melting workpiece and the preheating block may be used to remove gross deposits or impurities from the surface of the rotating workpiece. In addition, existing friction welding machines may be used with but slight modifications to preheat an element prior to friction welding.

What is claimed is:
1. A process for the friction welding of workpieces of dissimilar metals comprising the steps of
   (a) rotating the workpiece having the higher melting temperature,
   (b) placing a preheating block having a melting temperature higher than the melting temperature of both workpieces between the workpieces to be friction welded,
   (c) moving the workpiece having the lower melting temperature against the preheating block to force the preheating block against the end of the rotating workpiece,
   (d) backing off the lower melting workpiece from the preheating block and removing the preheating block from between the workpieces,
   (e) forcing the lower melting workpiece against the preheated end of the higher melting workpiece, and
   (f) rapidly stopping the relative rotation between the workpieces while continuing to force the workpieces together to form a friction weld.

2. A process for the friction welding of workpieces of dissimilar metals comprising the steps of
   (a) rotating the workpiece having the higher melting temperature,
   (b) forcing a preheating block having a melting temperature higher than the melting temperature of the higher melting workpiece against the end of the rotating higher melting workpiece, (c) removing the preheating block from contact with the rotating workpiece having a higher melting temperature, (d) forcing the workpiece having a lower melting temperature against the end of the rotating workpiece, (e) rapidly stopping the relative rotation between the workpieces while forcing the workpieces together to form a friction weld.

3. A process for the friction welding of workpieces of dissimilar metals comprising the steps of (a) relatively rotating and forcing together the end of the workpiece having the higher melting temperature against a preheating block having a melting temperature higher than either workpiece, (b) removing the preheating block from the end of the workpiece having the higher melting temperature, (c) forcing together and relatively rotating the workpieces, and (d) rapidly stopping the relative rotation between the workpieces while continuing to force the workpieces together to form a friction weld.

References Cited by the Examiner

Zvaranie VI/4, 1957; pages 106 and 108.

Friction Welding of Metals, by Vill', published June 25, 1963, pages 2, 3 and 57.

WHITMORE A. WILTZ, *Primary Examiner.*

JOHN F. CAMPBELL, *Examiner.*